United States Patent [19]
Menyes et al.

[11] Patent Number: 6,136,438
[45] Date of Patent: Oct. 24, 2000

[54] PROCESS FOR MODIFYING STATIONARY CARRIER PHASES CONTAINING SILANOL OR SILANOL GROUPS WITH CALIXARENES FOR CHROMATOGRAPHY

[76] Inventors: Ulf Menyes, Stefanistrasse 6, D-17489 Greifswald; Ulrich Roth, Dorfstrasse 13a, D-17498 Levenhagen; Christof Troltzsch, Uhlandstrasse 3, D-17489 Greifswald, all of Germany

[21] Appl. No.: 08/913,920

[22] PCT Filed: Jan. 23, 1997

[86] PCT No.: PCT/DE97/00180

§ 371 Date: Dec. 12, 1997

§ 102(e) Date: Dec. 12, 1997

[87] PCT Pub. No.: WO97/27479

PCT Pub. Date: Jul. 31, 1997

[30] Foreign Application Priority Data

Jan. 24, 1996 [DE] Germany .................. 196 02 393

[51] Int. Cl.$^7$ ...................................... B32B 5/16
[52] U.S. Cl. ........................... 428/405; 428/447
[58] Field of Search ...................... 428/447, 405

[56] References Cited

U.S. PATENT DOCUMENTS 4,699,966  10/1987  Harris et al. .................. 528/12

FOREIGN PATENT DOCUMENTS

WO 91/04095  4/1991  WIPO.

OTHER PUBLICATIONS

R. Brindle, "Silica–Bonded Calixarenes in Chromatology", Journal of Chromatography A, 19. Apr. 1997, vol. 731, No. 1, pp. 41–42.
J. Glennon, "Enhanced Chromatographic Selectivity for Na+ Ions on a Calixarene–Bonded Silica Phase", Analytical Letters, 1993, vol. 26, No. 1, pp. 153–162.

*Primary Examiner*—David W. Wu
*Assistant Examiner*—Caixia Lu
*Attorney, Agent, or Firm*—Scully, Scott, Murphy & Presser

[57] ABSTRACT

The invention relates to a method for the modification of stationary phases which contain silanol groups with calixarene for chromatography. The silanol groups in these phases, preferably silica gel or glass, are, according to the invention, first reacted with a dialkylsilane so that a maximum number of the silanol groups of the stationary phase is modified, and then linkage takes place, by means of heterogeneous hydrosilylation, between an olefinic group which is present in the calixarene and the silane functionality of the prepared stationary phase in the presence of one or more noble metal catalysts.

The invention's area of application is in column chromatography, including HPLC, thin-layer chromatography, including HPTLC, and thick-layer chromatography and gas chromatography with packed columns.

8 Claims, No Drawings

PROCESS FOR MODIFYING STATIONARY CARRIER PHASES CONTAINING SILANOL OR SILANOL GROUPS WITH CALIXARENES FOR CHROMATOGRAPHY

The invention relates to a method for the modification of silanol- or silanol group-containing stationary support phases with calixarenes for monomolecular covering of the support surface for chromatography and is suitable both for use in thin-layer chromatography (TLC and high performance thin-layer chromatography), in liquid chromatography (LC, column chromatography and high performance liquid chromatography) and in gas chromatography with packed columns.

BACKGROUND OF THE INVENTION

It is generally known that chromatography involves physicochemical methods for separating mixtures of substances for analytical and preparative purposes, in which the mixture to be separated is distributed by exchange processes on two auxiliary phases and thus fractionated in a way typical of its particular components. The precondition for use of chromatography is, however, that substances present in the mixture can be dissolved or vaporized without alteration. In most chromatographic methods, a liquid or gaseous mobile phase which carries the analysis mixture moves over a solid or liquid stationary phase.

The possibility of using calixarenes for the modification of the stationary support phase for chromatography was mentioned for the first time in the two Japanese published specifications Hei-5-264531 and Hei-6-58920, which propose the modification of support materials composed of glycidyl methacrylate after special preparation of the phases with p-hexachlorosulfonylcalix[6]arene or p-hexaaminocalix[6]arene. However, the phases have the crucial disadvantage that they consist of organic material. These support materials are cost-intensive and, moreover, not resistant to all HPLC solvents. In addition, the preparation of the support phase for the linkage to the particular calixarene is very complicated.

Jeremy D. Glennon et al. partly remedy this disadvantage in *Analytical Letters*, Jan. 26, 1993, pages 153–162, and in *Analytical Proceedings Including Analytical Communications*, January 1994, Vol. 33 (1), pages 33–35, since it is proposed to modify silica gel in the stationary support phase with various calix[4]arenes and calix[6]arenes.

In *Analytica Chimica Acta*, 291 (1994), pages 269–275, Jeremy D. Glennon et al. describe the linkage of the silane of the stationary support phase not directly to the olefinic unit of the calixarene, but uses mercaptopropyltriethoxysilane, which results in a thioether bridge in the molecule. The disadvantage of these solutions is based on the fact that linkage of the triethoxysilyl groups with one another may occur through a partial hydrolysis and subsequent ethanol elimination. This may in certain cases result in bridging of the required pores in the silica gel, which leads to a decrease in the specific surface area of the chromatography phase. Since it is known that only some of the triethoxysilyl groups become attached to the silica gel, hydrolysis results at least in part in terminal trihydroxysilyl groups. However, these are polar and adversely affect the chromatography which is to be operated as reverse phase chromatography. In the case of attachment via the thioether bridge it must, moreover, be expected that the chemical stability of the phase will be reduced.

Another type of attachment to silica gel is described by S. Friebe et al. in *Journal of Chromatographic Science*, Vol. 33, June 1995, pages 281–284, since they use, to couple on the p-tert-butylcalix[4]arene, a short hydrophilic spacer which, however, is not described in detail in its embodiment.

SUMMARY OF THE INVENTION

The invention relates to a method for the modification of stationary phases which contain silanol groups with calixarene for monomolecular covering of the support surface for chromatography. The silanol groups in these phases, preferably silica gel or glass, are first reacted with a dialkylsilane of Formula I hereinbelow so that a maximum number of the silanol groups of the stationary phase is modified, and, according to the invention, then linkage takes place, by means of heterogeneous hydrosilylation, between an olefinic group which is present in the calixarene and the silane functionality of the prepared stationary phase in the presence of heterogenous hydroxilyation catalyst, e.g. metal catalyst.

The invention's area of application is in column chromatography, including HPLC, thin-layer chromatography, including HPTLC, thick-layer chromatography and gas chromatography with packed columns.

DETAILED DESCRIPTION OF THE INVENTION

The object of the invention consists of a method which permits silanol- and silanol group-containing stationary phases for chromatography to be modified by attachment of calixarene without the presence of hydrolysis-sensitive ethoxysilyl groups, the intention being to achieve monomolecular covering of the silanol and silanol group-containing support surface. The object is achieved according to the invention by a method for the modification of silanol- or silanol group-containing stationary support phases with calixarene for monomolecular covering of the support surface for chromatography, preferably consisting of silica gel or glass, in such a way that, (a) first said silanol group of said stationary support and a dialkylsilane of formula I

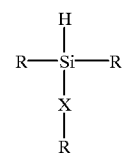

are reacted to form a modified stationary support, wherein
each R may be the same or different and is a hydrocarbyl group which is alkyl, aryl or cycloalkyl wherein said hydrocarbyl group may optionally contain a heteroatom,
X=N—R, O, S, or Se, and (b) subsequently, the linkage of an olefinic group which is present in said calixarene of the formula

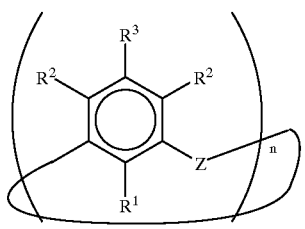

is reacted with the silane functionality of said modified stationary support by means of heterogeneous hydrosilylation, where, in the formula of the calixarene, n=3 to 12, $R^1$=H, $OR^4$, $SR^4$, $NR_2^4$, or $N^+R_3^4$,
$R^2$=H, $R^4$, $OR^4$, $SR^4$, $NR_2^4$, or $N^+R_3^4$,
$R^3$=H, $R^4$, $OR^4$, $SR^4$, $NR_2^4$, $N^+R_3^4$, $COR^4$, $COOR^4$, $CONR_2^4$, N=$NR^4$, or $SO_3R^4$
each Z independently=—$CR_2^4$, $R^4OR^4$, $SiR_2^4$, O, $R^4$, S, or N—$R^4$,
with
$R^4$ in calixarene
=H,
=alkyl, cycloalkyl, or heterocyclic, which alkyl and cycloalkyl and heterocyclic groups may be saturated or unsaturated,
=aryl or heteroaryl, or
=halogen,
provided that $R^1$ and/or $R^3$ contain at least one unsaturated group of the formula —CH=$CH_2$.

It is ensured according to the method that a very large number of silanol groups is modified by appropriate dialkylsilane.

The method according to the invention can be carried out in a really simple way because ethoxydimethylsilane, which can be purchased, can be used as dialkylsilane. This is reacted in dry toluene with the silica gel or glass while boiling under reflux under a nitrogen atmosphere. The calixarene provided for the particular separation task is modified in such a way that at least one terminal olefinic group is present in the molecule. The number of terminal olefinic groups and their position in the molecule is immaterial in this connection. Even one group is sufficient to be able to achieve attachment to the silane functionality of the modified silica gel or glass. The stereochemistry in the calixarene molecule must allow access to the silane group. The calixarene modified in this way is reacted in toluene in the presence of a suitable catalyst, such as, for example, hexachloroplatinic acid, with the silane in the sense of an addition reaction. The calixarene-modified silica gel or glass is washed with a suitable solvent in order to remove unreacted calixarene and the catalyst. It is subsequently dried in vacuo and prepared as stationary support for the particular separation task. The attachment, which has taken place according to the invention via the hydrophobic spacer, affords a silicon-carbon bond which is distinguished by extreme stability and insensitivity to hydrolysis.

The support can be employed directly for column chromatography or, after mixing with a suitable binder and possibly a fluorescence indicator, be applied to conventional plate and sheet materials for thin-layer chromatography, thick-layer chromatography or HPTLC. In gas chromatography the support can be employed in the form of packed columns.

In column chromatography, including HPLC, the organic and/or inorganic mixture of substances to be separated is put in a known manner on the column which contains the stationary phase modified according to the invention, and eluted by suitable organic and/or inorganic solvents or mixtures of solvents flowing through the column. The substances to be separated are detected at the end of the column after flowing through a suitable detector system and/or after collection.

In thin layer chromatography, including HPTLC, and thick-layer chromatography using the stationary phase which has been modified according to the invention and has been applied through binders and/or fluorescence indicators to conventional plates and sheet materials, the mixture of substances to be separated is loaded on in a conventional way at the starting point and developed in a suitable chamber using solvent or solvent mixture. After drying, the spots are detected on the plate or sheet in a suitable manner.

In gas chromatography with a packed column, the mixture of substances to be separated is vaporized in a known manner in an injector system and then, by means of a suitable carrier gas, passes through the separating column which is packed with the phase modified according to the invention. The substances are detected at the end of the column in a detection system in a suitable manner.

The invention is to be explained in detail by means of examples.

EXAMPLE 1

5 g of silica gel of the type Lichrosorb 10 micrometers supplied by Merck with a surface area of approximately 300 $mm^2$/g in 50 ml of toluene are mixed with 3.75 ml of ethoxydimethylsilane whose SiH content has been determined by titration with bromine in egg vinegar and subsequent back-titration with potassium iodide and thiosulfate, and boiled under reflux in a stream of nitrogen for 8 h. The silica gel is then filtered off with suction, washed with toluene/dioxane/chloroform/acetone and dried in vacuo. 4 g of the silica gel modified in this way are suspended in about 100 ml of dry toluene, 1.94 g of p-tert-butyl-calix[6]arene hexaallyl ether and 35.3 mg of $RhCl(PPh_3)_3$ are added, and the mixture is boiled under reflux in a stream of nitrogen for 16 h. The resulting calixarene-modified silica gel is washed with toluene/dioxane/chloroform/acetone and dried in vacuo.

EXAMPLE 2

5 g of silica gel of the type Lichrosorb 100 micrometers supplied by Merck in 50 ml of toluene are mixed with 3.75 ml of ethoxydimethylsilane and boiled under reflux in a stream of nitrogen for 8 h. The silica gel is then filtered off with suction, washed with toluene/dioxane/chloroform/acetone and dried in vacuo. 4 g of the silica gel modified in this way are suspended in dry toluene, 1.4 g of calix[6]arene hexaallyl ether and 35.3 mg of $RhCl(PPh_3)_3$ are added, and the mixture is boiled under reflux in a stream of nitrogen for 16 h. The resulting calixarene-modified silica gel is then washed with toluene/dioxane/chloroform/acetone and dried in vacuo.

What is claimed is:

1. A method for the modification of a silanol- or silanol group containing stationary support phase with calixarene for monomolecular covering of the support surface for chromatography comprising (a) reacting said silanol group of said stationary support with a dialkylsilane of the formula:

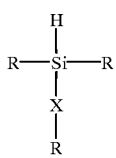

to form a modified stationary support, wherein each R is the same or different and is an hydrocarbyl group which is an alkyl, cyclicalkyl or aryl group wherein said hydrocarbyl group may optionally contain a heteroatom, and X=N—R, O, S or Se, (b) and then reacting the linkage of an olefinic group which is present in said calixarene and has the formula

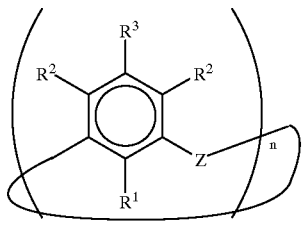

with the silane functionality of said modified stationary support under heterogeneous hydrosilylation reaction conditions, where in the formula of the calixarene, n is 3 to 12;

$R^1$ is H, $OR^4$, $SR^4$, $N(R^4)_2$, or $N^+(R^4)_3$;

$R^2$ is H, $R^4$, $OR^4$, $SR^4$, $N(R^4)_2$, or $N^+(R^4)_3$;

$R^3$ is H, $R^4$, $OR^4$, $SR^4N(R^4)^2$, $N^+(R^4)_3$, $COR^4$, $COOR^4$, $CON(R^4)^2$, $N{=}NR^4$, or $SO_3R^4$ each Z is independently $C(R^4)_2$, $R^{4'}$ $OR^{4'}$, $Si(R^4)_2$, O, $R^4$, S, or $N—R^4$;

each $R^4$ in calixarene is independently hydrogen, halogen, a hydrocarbyl group which is linear or branched or cyclic, which hydrocarbyl group is saturated or unsaturated, wherein the carbon atom in said hydrocarbyl group may optionally be replaced with a heteroatom;

each $R^{4'}$ is the same or different and is alkylene, provided $R^1$ and/or $R^3$ contains at least one unsaturated group of the formula $CH{=}CH_2$.

2. The method according to claim 1 wherein each R is the same or different and is alkyl, aryl, cycloalkyl, heterocyclic or heteroaryl.

3. The method according to claim 1 wherein each Z is independently $C(R^4)_2$, $Si(R^4)_2$, O, $R^4$, S or $NR^4$.

4. The method according to claim 1 wherein the stationary support is used in column chromatography, thin layer chromatography or gas chromatography.

5. The method according to claim 1 in which X is S, O, or Se.

6. The method according to claim 1 in which the stationary support is silica gel or glass.

7. The method according to claim 1 in which the modified stationary support is the reaction product of ethoxydimethylsilane with silica gel or glass.

8. The method according to claim 1 in which the calixarene is p-tert-butyl calix[6]arene hexaallyl ether or calix[6]arene hexaallyl ether.

* * * * *

UNITED STATES PATENT AND TRADEMARK OFFICE
CERTIFICATE OF CORRECTION

PATENT NO.   : 6,136,438
DATED        : October 24, 2000
INVENTOR(S)  : Ulf Menyes et al.

It is certified that error appears in the above-identified patent and that said Letters Patent is hereby corrected as shown below:

Column 2,
Lines 61-64, delete "a hydrocarbyl group which is alkyl, aryl or cycloakyl wherein said hydrocarbly group may optionally contain a heteroatom," and insert -- alkyl, aryl, cycloalkyl or heterocyclic or heteroaryl which R group may be substituted or unsubstituted, --

Column 6,
Line 1, "$(R^4)^2$" should read -- $(R^4)_2$ --

Signed and Sealed this

Fourth Day of May, 2004

JON W. DUDAS
*Acting Director of the United States Patent and Trademark Office*